United States Patent [19]
Heeringa

[11] Patent Number: 5,838,553
[45] Date of Patent: Nov. 17, 1998

[54] VOLTAGE STABILIZED SELF-OSCILLATING POWER SUPPLY

[75] Inventor: Schelte Heeringa, Drachten, Netherlands

[73] Assignee: U.S. Philips Corporation, New York, N.Y.

[21] Appl. No.: 800,704

[22] Filed: Feb. 14, 1997

[30] Foreign Application Priority Data

Mar. 1, 1996 [EP] European Pat. Off. ............... 9600557

[51] Int. Cl.⁶ .......................... H02M 3/335; H02J 7/10
[52] U.S. Cl. .............................. 363/18; 363/19; 320/140
[58] Field of Search ................................ 363/18, 19, 21; 320/140; 323/284, 285, 299

[56] References Cited

U.S. PATENT DOCUMENTS

| | | | |
|---|---|---|---|
| 4,652,984 | 3/1987 | Van Der Akker et al. | 363/18 |
| 4,684,871 | 8/1987 | Plagge | 320/21 |
| 4,710,695 | 12/1987 | Yamada et al. | 320/21 |
| 5,012,399 | 4/1991 | Takemura et al. | 363/18 |
| 5,390,100 | 2/1995 | Pacata | 363/19 |
| 5,412,555 | 5/1995 | Uramoto | 363/18 |

*Primary Examiner*—Adolf Berhane
*Attorney, Agent, or Firm*—Bernard Franzblau

[57] ABSTRACT

In a self-oscillating power-supply circuit for charging a battery, the main switching transistor is turned off by a second switching transistor (T2) of an opposite conductivity type, which is arranged in series with the main switching transistor (T1) via a sensing resistor (R8). This configuration allows rapid switching of the main switching transistor (T1). The power-supply circuit can be turned on and off in a simple manner (R7, T4). Moreover, it is simple to provide a compensation (R4) for varying mains voltages, an auxiliary voltage (D6, C4) for powering additional circuits (R9, R10), which auxiliary voltage also remains available when the power-supply circuit is turned off.

41 Claims, 6 Drawing Sheets

VOLTAGE STABILIZED SELF-OSCILLATING POWER SUPPLY

FIELD OF THE INVENTION

This invention relates to a power-supply circuit for powering a load from an input voltage, which circuit comprises: a transformer having a primary winding and a secondary winding; a first switching transistor having a control electrode, having a first main electrode and having a second main electrode coupled to the primary winding for periodically connecting the primary winding to the input voltage; a sensing resistor coupled to the first main electrode of the first switching transistor; means for turning off the first switching transistor in response to a voltage drop across the sensing resistor, which means include a second switching transistor; and a rectifier diode connected, in series with the load to be powered, to the secondary winding.

BACKGROUND OF THE INVENTION

Such a power-supply circuit is known from U.S. Pat. No. 4,684,871, particularly FIG. 3, and can be used for charging batteries and for powering electrical appliances. Such a power-supply circuit is particularly suitable for use in an electric shaver comprising rechargeable batteries, in which case the power-supply circuit supplies the charging current for the batteries and the supply current for the motor of the shaver. In the known power-supply circuit the first switching transistor is a bipolar transistor. A starting resistor supplies a starting current to the control electrode or base of the switching transistor, which is consequently turned on. This results in a current through the primary winding of the transformer. This primary current induces a voltage in the secondary winding, which is fed back in a positive sense to the base of the first switching transistor by means of a feedback circuit comprising the series arrangement of a capacitor and a resistor. As a result of this, the first switching transistor is rapidly saturated. During the forward interval the primary current increases linearly until the first switching transistor is turned off. The primary current flows through the sensing resistor arranged in the emitter lead of the first switching transistor. The base-emitter junction of the second transistor is connected across this sensing resistor to short-circuit the base of the first switching transistor if the voltage across the sensing resistor exceeds a given value. As a result of the short-circuit the first switching transistor is turned off. In the flyback interval which then begins, the energy stored in the transformer is transferred, via the rectifier diode, to the load to be powered, causing a gradually decreasing secondary current to flow in the secondary winding. At the transition from the forward interval to the flyback interval the sign (polarity) of the secondary voltage is reversed and again cut-off of the switching transistor is accelerated by positive feedback via the feedback circuit. At the end of the flyback interval the rectifier diode is turned off and a waiting interval begins, in which the voltage difference built up across the first capacitor of the feedback circuit is compensated via the starting resistor until the drive voltage available on the base of the first switching transistor has again become sufficient to turn on this transistor. Thus, the power-supply circuit is self-oscillating. Instead of a series arrangement of a resistor and a capacitor the feedback circuit may comprise a separate winding which drives the first control electrode of the first switching transistor in an appropriate manner.

This known power-supply circuit can operate with input voltages derived from the rectified mains voltage. This poses a few problems. The nominal mains voltage can vary between 100 and 240 V a.c. The rectified voltage varies to the same extent and influences the period of an oscillation cycle. The oscillation frequency therefore depends on the applied mains voltage. In its turn, the average value of the current supplied by the power-supply circuit is proportional to the oscillation frequency. Thus, it appears that the average output current is dependent upon the applied mains voltage. This is unfavorable when batteries are to be charged because these must be charged with a known current so as to avoid overcharging.

Moreover, the rectified mains voltage can be very high. A very large direct voltage appears across the switching transistor when it is turned off. The switching losses in the switching transistor as a result of finite switching times can therefore be substantial.

SUMMARY OF THE INVENTION

It is an object of the invention to solve these and other problems. To this end, the power-supply circuit of the type defined in the opening paragraph is characterized in that the second switching transistor is arranged in series with the first switching transistor, a first main electrode of the second switching transistor being coupled to the first main electrode of the first switching transistor via the sensing resistor, and the second switching transistor being of a conductivity type opposite to that of the first switching transistor.

The second switching transistor makes it possible to turn off the first switching transistor rapidly and thereby reduce the switching losses. The opposite conductivity type of the second switching transistor makes it possible to turn on and turn off the power-supply circuit in a comparatively simple manner and to compensate for varying input voltages by very simple means.

In view of this compensation, an embodiment of the power-supply circuit in accordance with the invention is characterized in that the power-supply circuit further comprises a compensation resistor connected between the control electrode of the second switching transistor and a node between the rectifier diode and the secondary winding. The voltage on the node between the rectifier diode and the secondary winding increases with the input voltage. The increase leads to a higher bias voltage for the control electrode of the first switching transistor in the case of a higher input voltage, as a result of which the first switching transistor is turned off at a smaller primary current.

A further embodiment of the power-supply circuit in accordance with the invention is characterized in that the means for turning off comprise: a voltage divider comprising a first resistor and a second resistor connected to one another in a tap, which voltage divider is arranged in parallel with a series arrangement including at least the sensing resistor and a main current path of the second switching transistor; a third switching transistor of the same conductivity type as the second switching transistor and having a control electrode connected to the tap of the voltage divider, a first main electrode coupled to the first resistor, and a second main electrode coupled to the control electrode of the second switching transistor; and a third resistor connected between the control electrode of the second switching transistor and a voltage terminal.

In this embodiment, at least in the case of bipolar transistors, the peak current depends on the base-emitter voltage of the third switching transistor and on the current gain factor of the second switching transistor. This provides temperature compensation for the primary current. The voltage divider and the third transistor can be disposed in parallel with the series arrangement of the sensing resistor and the main current path of the second switching transistor. If the junction of the control electrode and the first main electrode of the first switching transistor is also included in the series arrangement the level of the primary current at which the first switching transistor is turned off is also lowered.

The third resistor can be connected to a suitable voltage terminal and, furthermore, a switching element, for example a transistor, can be arranged in series with the third resistor. The power-supply circuit can then be turned on and turned off by means of the switching element.

At the end of the life of a rechargeable battery it often occurs that the battery is internally open-circuited. In order to prevent the power-supply circuit from becoming defective because the energy in the transformer cannot be drained, the third resistor can be connected to the node between the secondary winding and the load to be powered, via a transistor of the same conductivity type as the first switching transistor, the control electrode of this transistor being connected to a bias voltage which is higher than the highest voltage anticipated across the load and the first main electrode of this transistor being connected to said node.

The influence of the battery voltage on the primary peak current can be reduced by connecting the third resistor to the node between the rectifier diode and the load to be powered. Again, the power-supply circuit can be switched on and switched off by means of a transistor in series with the third resistor. Preferably, at least in the case of a bipolar transistor, this transistor is of the same conductivity type as the first transistor in order to prevent the battery from being drained when the power-supply circuit is turned off.

A further embodiment of the power-supply circuit is characterized in that the power-supply circuit further comprises a zener diode connected between the control electrode of the first switching transistor and a voltage terminal. The zener diode absorbs the drive current of the first switching transistor when this switching transistor is turned off and limits the voltage on the control electrode of the first switching transistor when this transistor is turned off. When the first switching transistor is turned off the first main electrode of the first switching transistor supplies an actively buffered voltage, which is determined, inter alia, by the zener voltage of the zener diode. Thus, the voltage across the second switching transistor is limited and this transistor can be a regular low-voltage transistor.

The actively buffered voltage can also be used for other purposes. To this end, an embodiment is characterized in that the power-supply circuit comprises a further rectifier diode connected between the first main electrode of the first switching transistor and a supply terminal, and a smoothing capacitor coupled to the supply terminal. The further rectifier diode is cut off when the switching transistor conducts and prevents the smoothing capacitor from being discharged. When the first switching transistor is turned off the further diode conducts and the smoothing capacitor is charged by means of the actively buffered voltage. The voltage on the smoothing capacitor can be used for powering additional electronic circuits. In a shaver such circuits can be, for example, a control unit, a display and a micropro- cessor. This voltage remains available even when the power-supply circuit has been switched of by means of the aforementioned switching element or transistor in series with the third resistor. The voltage on the smoothing capacitor can, for example, serve as the source for said bias voltage which is higher than the highest voltage anticipated across the load or battery.

BRIEF DESCRIPTION OF THE DRAWING

These and other aspects of the invention will be described and elucidated with reference to the accompanying drawings, in which.

In these Figures like parts bear the same reference symbols.

DETAILED DESCRIPTION OF THE PREFERRED EMBODIMENTS

Figure 1:
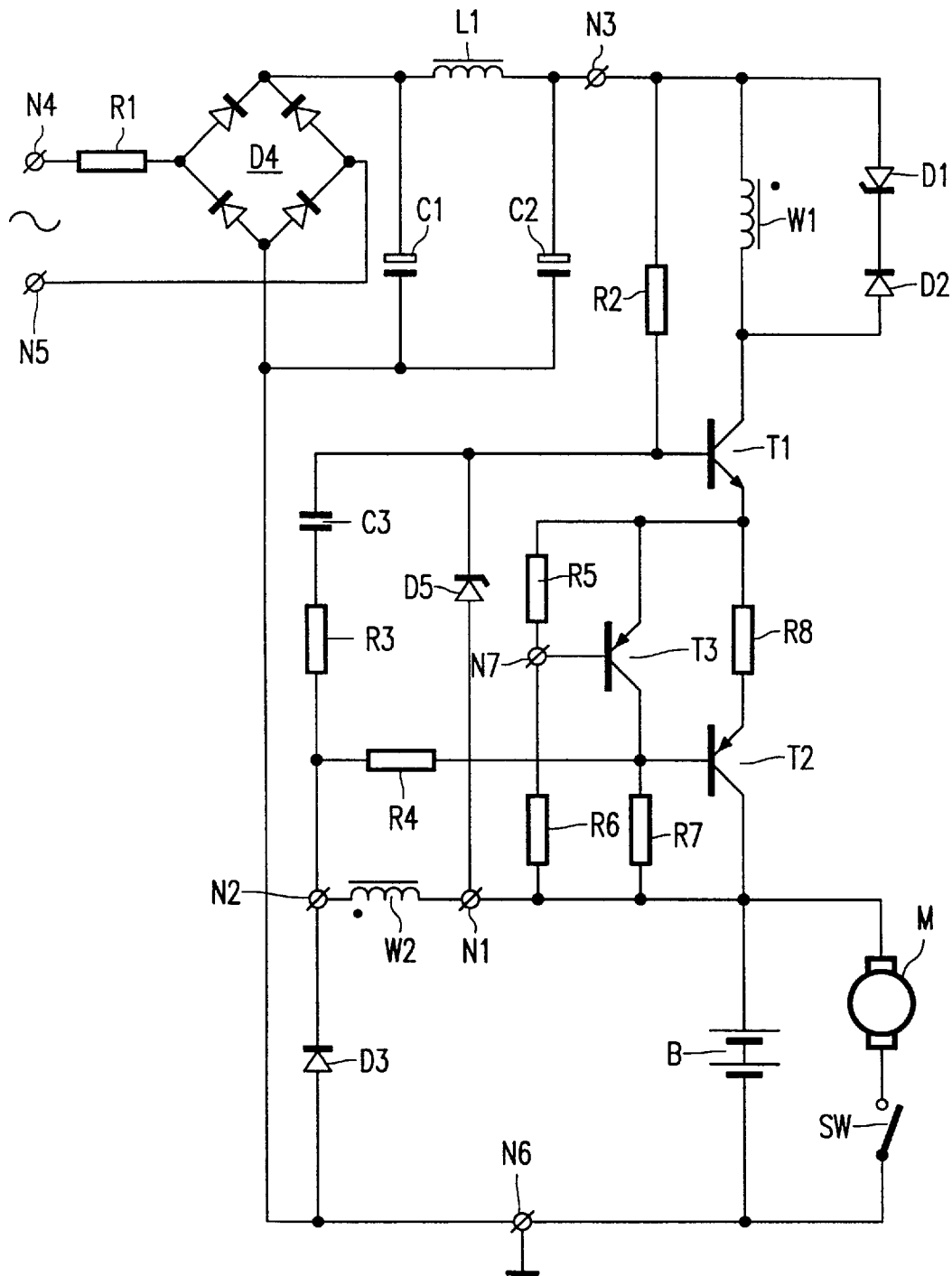
FIG. 1 shows an embodiment of a power-supply circuit in accordance with the invention.

FIG. 1 shows a circuit diagram of an embodiment of a power-supply circuit in accordance with the invention. The alternating mains voltage or a suitable direct voltage is applied to the input terminals N4 and N5. The alternating voltage is rectified by means of a diode bridge D4 and is smoothed and filtered by means of capacitors C1 and C2 and a coil L1. An optional resistor R1 in series with one of the input terminals N4 or N5 limits the current through the diode bridge D4. The negative terminal of the rectified input voltage is connected to ground. The positive terminal N3 is connected to a primary winding W1 of a transformer. A zener diode D1 and a diode D2 are arranged in parallel with the primary winding W1 and limit the voltage across the primary winding W1 when the current through the primary winding W1 is interrupted. The main current path of a switching transistor T1, comprising a bipolar NPN transistor, is connected in series with the primary winding W1, which transistor has its second main electrode or collector coupled to the primary winding W1. The first main electrode or emitter of the switching transistor T1 is connected to the emitter of a PNP switching transistor T2 via a resistor R8, which switching transistor T2 has its collector connected to a first terminal N1 of a secondary winding W2 of the transformer, which secondary winding is magnetically coupled to the primary winding W1. The secondary winding W2 also has its first terminal N1 connected to a load to be powered, which is for example a rechargeable battery B. The positive terminal of the battery B is connected to the first terminal N1. The negative terminal of the battery B is connected to a terminal N6, which is connected to a second terminal N2 of the secondary winding W2 via a rectifier diode D3. The terminal N6 is, for example, connected to ground. As a result of this, not only the current through the secondary winding but also the current through the primary winding flow through the battery B. If this is not desirable, the first terminal N1, instead of the terminal N6, may be connected to ground. The control electrode or base of the switching transistor T1 is connected to the positive terminal N3 via a resistor R2, but connection to another suitable voltage, if desired a voltage which has been stabilized with respect to the rectified mains voltage, is also possible. A series arrangement of a capacitor C3 and a resistor R3 is connected between the base of the switching transistor T1 and the second terminal N2 of the secondary winding W2.

Furthermore, the switching transistor T1 has its base connected to the first terminal N1 via a threshold element comprising a zener diode D5. A threshold element is to be understood to mean an element having a comparatively high impedance as long as the voltage across the element is below a given threshold voltage, and having a comparatively low impedance when the voltage across the element exceeds the threshold voltage. This category includes the zener diode, the diac and the gas-filled regulator tube. If desired, a speed-up capacitor may be arranged across the resistor R3 to speed up the turn-on of the switching transistor T1.

The base of the second switching transistor T2 is connected to the second terminal N2 of the secondary winding W2 via a resistor R4 and to the first terminal N1 of the secondary winding W2 via a resistor R7. Moreover, there has been provided a voltage divider comprising the resistors R5 and R6 interconnected in a tap N7. The voltage divider is connected across the series arrangement of the resistor R8 and the emitter-collector path of the switching transistor T2, the resistor R5 being connected to the node between the resistor R8 and the emitter of the switching transistor Ti. A PNP switching transistor T3 has its base-emitter junction connected in parallel with the resistor R5, has its base connected to the tap N7 and has its collector connected to the base of the switching transistor T2. A motor M can be connected to the battery B by means of a switch SW. The motor M can be, for example, the motor of a shaver.

When the input voltage is received a starting current will flow from the positive terminal N3, via the resistor R2, to the base of the switching transistor T1, which is consequently turned on. The forward interval or forward phase begins. Now a current starts to flow from the positive terminal N3 to the terminal N6 via the primary winding W1, the switching transistor T1, the resistor R8 and the battery B. The switching transistor T2 conducts because base current can flow via the resistor R7. The voltage difference across the primary winding W1 induces a transformed voltage difference across the secondary winding W2, the second terminal N2 then being positive relative to the first terminal N1. The cathode of the diode D3 is then positive relative to the anode of the diode D3, as a result of which the diode D3 is cut off. The positive voltage difference across the secondary winding W2 has a positive-feedback effect and drives the base-emitter junction of the switching transistor T1 further into conduction via the capacitor C3, the drive current being limited by the resistor R3. It is to be noted that such a positive feedback can also be achieved in another manner, for example by means of a separate winding coupled to the base of the switching transistor T1 in an appropriate manner. The switching transistor T1 is bottomed and an increasing current begins to flow through the primary winding W1. This increasing current produces an increasing voltage drop across the resistor R8 and the collector-emitter path of the switching transistor T2.

The switching transistor T1 remains in the on-state until the increasing voltage drop across the resistor R5 drives the transistor T3 into conduction. As a result of this, the switching transistor T2 receives less base current and is turned off, which causes the collector-emitter voltage across the switching transistor T2 to increase. The increasing collector-emitter voltage, in its turn, leads to an increasing voltage drop across the resistor R5. The resulting positive feedback causes the emitter current of the switching transistor T1 to be interrupted very rapidly. The base current of the switching transistor T1 is now drained via the low impedance of the zener diode D5, as a result of which the switching transistor T1 is consequently turned off rapidly and the current through the primary winding W1 is interrupted. Now the flyback interval or flyback phase begins, in which the energy stored in the transformer is transferred to the battery B.

The interruption of the current through the primary winding W1 gives rise to a large voltage increase across the primary winding W1, which voltage increase is positive relative to the input voltage on the positive terminal N3 and which is limited by the diode D2 and the zener diode D1. As a result of the current interruption, the sign of the voltage across the primary winding W1 and, as a consequence, that of the voltage across the secondary winding W2 is reversed. The second terminal N2 of the secondary winding W2 is now negative relative to the first terminal N1. The diode D3 now conducts and a secondary current flows in the secondary circuit formed by the secondary winding W2, the diode D3 and the battery B, the energy in the transformer being transferred to the battery B. The secondary current decreases to zero. As long as the diode D3 conducts, the negative voltage across the secondary winding W2 is equal to the sum of the voltage across the diode D3 and the voltage of the battery B. The negative voltage transient across the secondary winding W2 appears across the capacitor C3 and keeps the base of the switching transistor T1 at a negative voltage. The capacitor C3 is now discharged via the zener diode D5, which is now poled in the forward direction, and the resistor R3. Since no current flows through the switching transistor T2 and the resistor R8, the voltage across the resistor R5 is zero, as a result of which the switching transistor T3 is also turned off. The switching transistor T2 will now remain cut off until the voltage on the base of the switching transistor T1 is again sufficiently positive and a new oscillation cycle is started. The power-supply circuit is consequently self-oscillating.

The resistor R4 serves for mains-voltage compensation and can be dispensed with, if desired. The current through the resistor R4 ensures that the base of the transistor T2 receives a higher bias voltage in the case of a higher rectified mains voltage on the positive terminal N3, as a result of which the transistor T1 is turned off at a smaller primary current.

The primary current Ip at which the switching transistors T2 and T3 are turned off is given by the following formula:

$$Ip = \frac{Vbe_{T3}\frac{R5}{R5+R6} - Vsec\frac{R7}{R4+R7} - Vbe_{T2}}{R8 - \frac{R4 \cdot R7}{HFE_{T2}(R4+R7)}}$$

in which Vsec is the voltage across the secondary winding W2 in the forward interval, $Vbe_{T2}$ is the base-emitter voltage of the switching transistor T2, $Vbe_{T3}$ is the base-emitter voltage of the switching transistor T3, $HFE_{T2}$ is the gain factor of the transistor T2, and R4 through R8 are the resistance values of the corresponding resistors R4 through R8. The secondary voltage Vsec across the secondary winding W2 is substantially proportional to the primary voltage across the primary winding W1. The choice of the resistance value R4 determines the relationship between the mains voltage and the primary current Ip. It is further apparent from the formula that the peak current Ip depends on the base-emitter voltage $Vbe_{T3}$ of the transistor T3 and on the gain factor $HFE_{T2}$ of the transistor T2. As a result of this, a temperature compensation is obtained for the primary peak current Ip. As a matter of fact, the base-emitter voltage decreases and the gain factor increases when the temperature rises.

Figure 2:
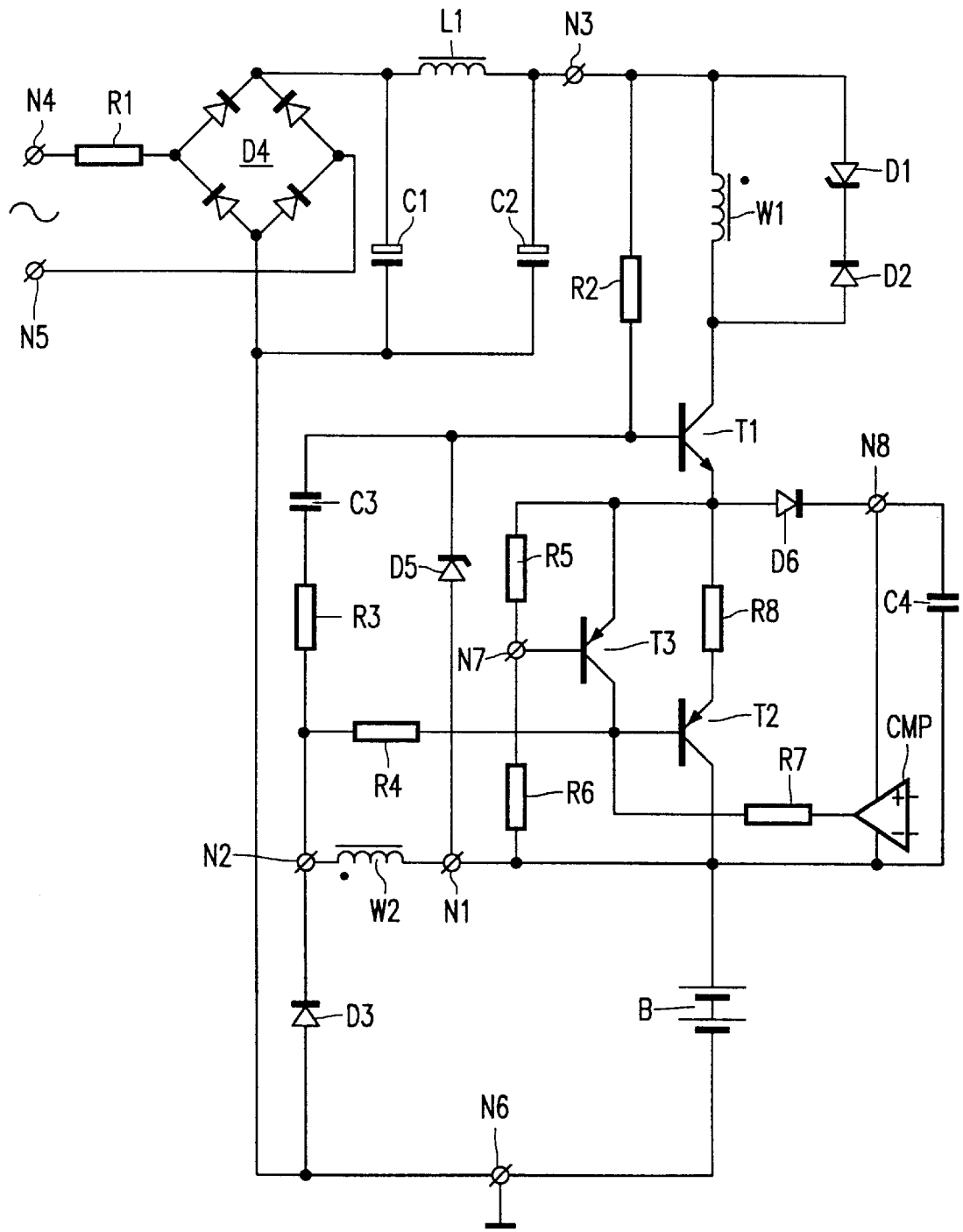
FIG. 2 shows an embodiment of a power-supply circuit in accordance with the invention.

FIG. 2 shows an extension of the circuit shown in FIG. 1. The switching transistor T1 has its emitter connected to a supply terminal N8 via a diode D6 and to one electrode of a smoothing capacitor C4, whose other electrode is connected to the first terminal N1, but it is to be noted that connection to the terminal N6 (ground) is also possible. Each time that the transistor T1 is turned off the emitter voltage of the transistor T1 increases. The current which at first flowed through the resistor R8 now passes through the diode D6 until the transistor T1 is cut off. Thus, the smoothing capacitor C4 is re-charged with a pulsating current up to a voltage equal to the zener voltage of the zener diode D5 minus the base-emitter voltage of the transistor T1 and the diode voltage of the diode D6. The voltage across the smoothing capacitor C4 can be used for powering additional electronic circuits such as operational amplifiers, comparators etc. FIG. 2 by way of example shows a comparator CMP, which is powered by the voltage across the smoothing capacitor C4. The resistor R7 is connected between the base of the transistor T2 and the output of the comparator CMP. If the output of the comparator is low, i.e. at a level which corresponds substantially to the voltage on the first terminal N1, the power-supply circuit operates as explained for the embodiment described with reference to FIG. 1. If the output of the comparator is high, i.e. at a level which corresponds substantially to the voltage on the supply terminal N8, the power-supply circuit is turned off. This is because the transistor T2 then cannot draw base current via the resistor R7, as a result of which the transistor T1 can no longer supply emitter current to the transistor T2 and oscillation is impossible. However, in this situation the transistor T1 operates as a buffer for the zener voltage of the zener diode D5, which is kept in the conductive state via the resistor R2. Thus, the voltage on the smoothing capacitor C4 is sustained when the power-supply circuit does not oscillate and mains voltage is applied.

Figure 3:
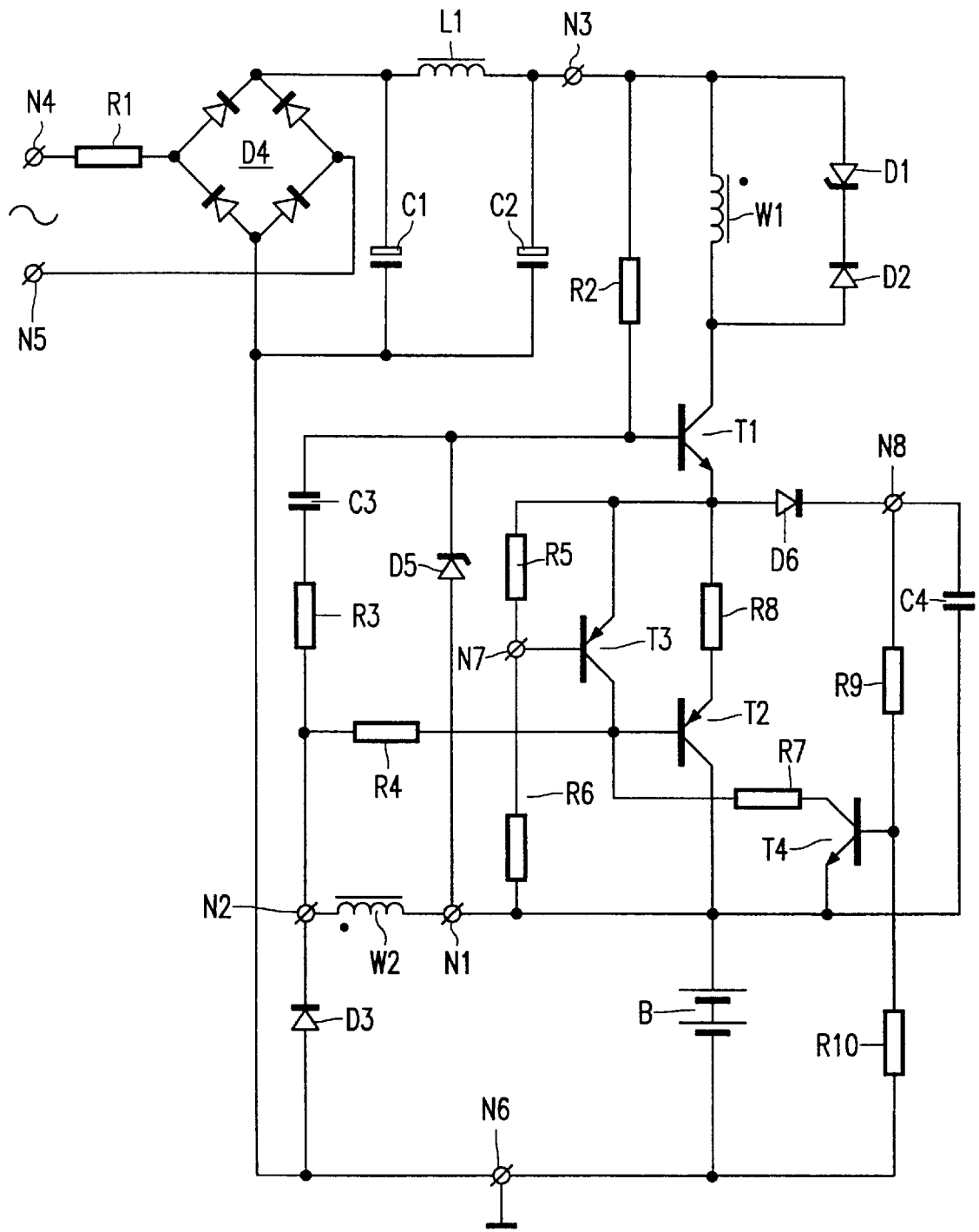
FIG. 3 shows an embodiment of a power-supply circuit in accordance with the invention.

FIG. 3 shows an embodiment in which the resistor R7 is connected to the first terminal N1 via an NPN transistor T4. The base of the transistor T4 is connected to the supply terminal N8 via a resistor R9 and to the terminal N6 via a resistor R10. The resistors R9 and R10 are dimensioned in such a manner that the transistor T4 ceases to conduct when the battery voltage of the battery B exceeds a maximum value. Thus, charging of the battery is stopped. At the end of the battery life it often occurs that the battery is internally open-circuited. The transistor T4 and the resistors R9 and R10 also prevent the power-supply circuit from becoming defective because the energy in the transformer cannot be drained to the battery. In that case the power-supply circuit is also turned off.

Figure 4:
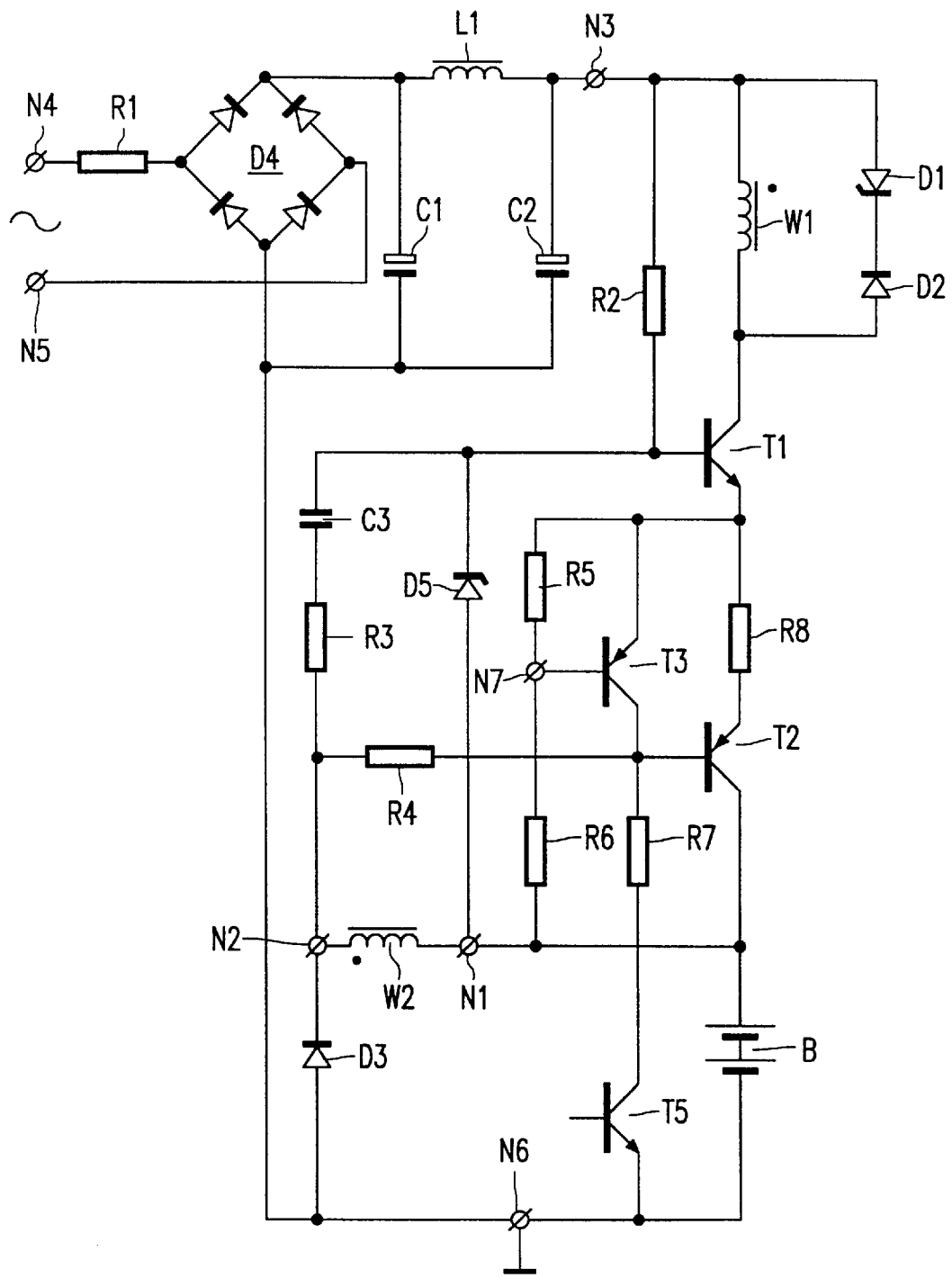
FIG. 4 shows an embodiment of a power-supply circuit in accordance with the invention.

FIG. 4 shows an embodiment in which the resistor R7 is connected to the terminal N6 via an NPN transistor T5. In this configuration the peak current at which the transistor T1 is turned off depends on the voltage across the battery B. The average charging current then depends on the battery voltage. In order to prevent the battery from being drained via the collector-base diode of the transistor T2 and the resistor R7 if the mains voltage is not applied, the transistor T5 takes the form of an NPN transistor. The collector-base diode is then cut off. By means of the transistor T5 it is also possible to turn off the power-supply circuit when this circuit charges the battery B from the rectified mains voltage.

Figure 5:
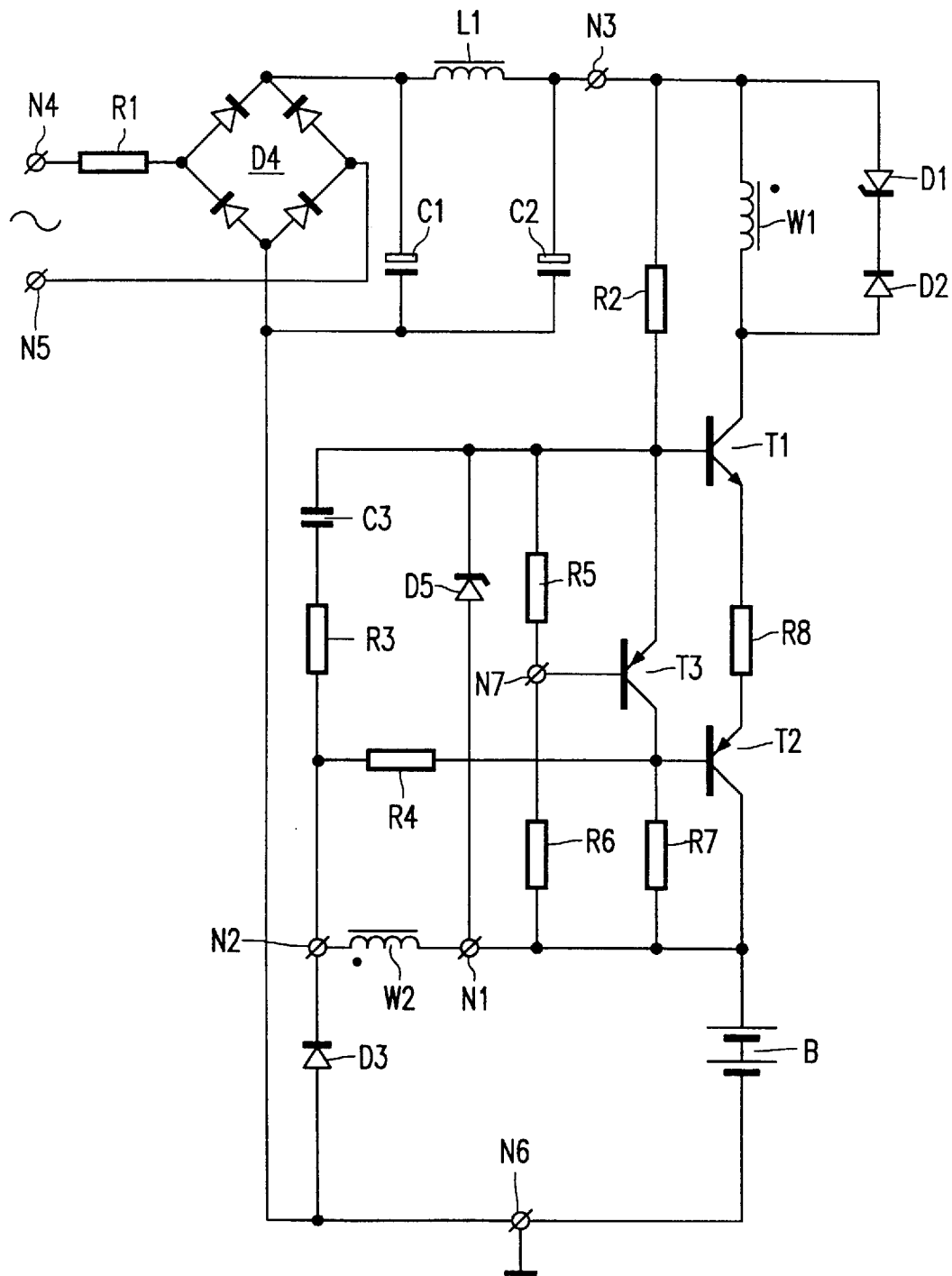
FIG. 5 shows an embodiment of a power-supply circuit in accordance with the invention.

FIG. 5 shows an embodiment in which the resistor R5 of the voltage divider R5/R6 and the emitter of the transistor T3 are connected to the base of the transistor T1 instead of to the emitter of the transistor T1. Thus, it is achieved that the peak current at which the transistor T1 is turned off is smaller than in the embodiment shown in FIG. 1.

The bipolar transistors in the embodiments described herein can be replaced by unipolar (MOS) transistors, in which case the first main electrode, the second main electrode and the control electrode respectively correspond to the source, the drain and the gate of the unipolar transistor.

Figure 6:
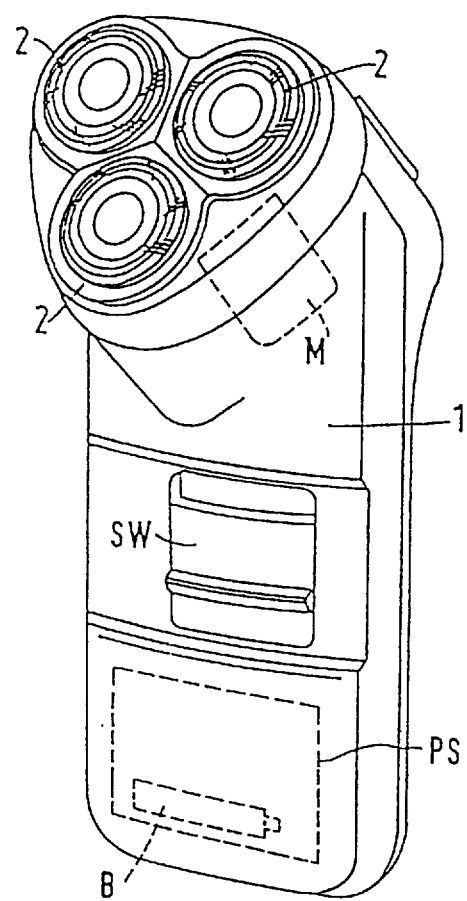
FIG. 6 shows an electric shaver comprising a power-supply circuit in accordance with the invention.

FIG. 6 shows an electric shaver having a housing 1 which accommodates the power-supply circuit, referenced PS, the battery B and the motor M. The motor drives the shaver heads 2 and is operated by means of the switch SW.

I claim:

1. A power-supply circuit for powering a load from an input voltage, which circuit comprises: a transformer having a primary winding and a secondary winding; a first switching transistor having a control electrode, having a first main electrode and having a second main electrode coupled to the primary winding for periodically connecting the primary winding to the input voltage; a sensing resistor coupled to the first main electrode of the first switching transistor; means including a second switching transistor for turning off the first switching transistor in response to a voltage drop across the sensing resistor; a rectifier diode connected in series with the load to be powered to the secondary winding, characterized in that the second switching transistor is connected in series with the first switching transistor with a first main electrode of the second switching transistor coupled to the first main electrode of the first switching transistor via the sensing resistor, and the second switching transistor is of a conductivity type opposite to that of the first switching transistor.

2. A power-supply circuit as claimed in claim 1, wherein the means for turning off the first switching transistor comprise: a voltage divider comprising a first resistor and a second resistor, means coupling the voltage divider in parallel with a series arrangement including at least the sensing resistor and a main current path of the second switching transistor; a third switching transistor of the same conductivity type as the second switching transistor and having a control electrode connected to a tap on the voltage divider, a first main electrode coupled to the first resistor, and a second main electrode coupled to the control electrode of the second switching transistor; and a third resistor connected between the control electrode of the second switching transistor and a voltage terminal.

3. A power-supply circuit as claimed in claim 2, further comprising in that a switching element coupled in series with the third resistor.

4. A power-supply circuit as claimed in claim 3, wherein the switching element comprises a further transistor of the same conductivity type as that of the first switching transistor said further transistor having a first main electrode coupled to the voltage terminal, a second main electrode coupled to the third resistor, and a control electrode connected to receive a bias voltage.

5. A power-supply circuit as claimed in claim 2 wherein the voltage terminal is a node between the secondary winding and the load.

6. A power-supply circuit as claimed in claim 2 wherein the voltage terminal is a node between the rectifier diode and the load.

7. A power-supply circuit as claimed in claim 2 wherein which further comprises a compensation resistor connected between the control electrode of the second switching transistor and a node between the rectifier diode and the secondary winding (W2).

8. A power-supply circuit as claimed in claim 1 wherein which further comprises a zener diode connected between the control electrode of the first switching transistor and a voltage terminal.

9. A power-supply circuit as claimed in claim 8, which comprises a further rectifier diode connected between the first main electrode of the first switching transistor and a supply terminal, and a smoothing capacitor coupled to the supply terminal.

10. A power-supply circuit as claimed in claim 2 wherein the first resistor of the voltage divider is connected to the control electrode of the first switching transistor.

11. A power-supply circuit as claimed in claim 1 which further comprises a feedback capacitor and a feedback resistor connected in series between the control electrode of the first switching transistor and a node between the rectifier diode and the secondary winding.

12. An electric shaver comprising: a rechargeable battery, an electric motor, a switch for connecting the motor to the battery, and a power-supply circuit as claimed in claim 1, coupled to at least one of the battery and the motor.

13. A power supply circuit as claimed in claim 3, wherein the voltage terminal is a node between the secondary winding and the load to be powered.

14. A power supply circuit as claimed in claim 4, wherein the voltage terminal is a node between the secondary winding and the load to be powered.

15. A power supply circuit as claimed in claim 3, wherein the voltage terminal is a node between the rectifier diode and the load to be powered.

16. A power-supply circuit as claimed in claim 3, wherein the power-supply circuit further comprises a compensation resistor connected between the control electrode of the second switching transistor and a node between the rectifier diode and the secondary winding.

17. A power-supply circuit as claimed in claim 4, which further comprises a compensation resistor connected between the control electrode of the second switching transistor and a node between the rectifier diode and the secondary winding.

18. A power-supply circuit as claimed in claim 5, wherein the power-supply circuit further comprises a compensation resistor connected between the control electrode of the second switching transistor and a node between the rectifier diode and the secondary winding.

19. A power-supply circuit as claimed in claim 6, wherein the power-supply circuit further comprises a compensation resistor connected between the control electrode of the second switching transistor and a node between the rectifier diode and the secondary winding.

20. A power-supply circuit as claimed in claim 3, which further comprises a zener diode connected between the control electrode of the first switching transistor and a voltage terminal.

21. A power-supply circuit as claimed in claim 3, wherein the first resistor of the voltage divider is connected to the control electrode of the first switching transistor.

22. A power-supply circuit as claimed in claim 4, wherein the first resistor of the voltage divider is connected to the control electrode of the first switching transistor.

23. A power-supply circuit as claimed in claim 5, wherein the first resistor of the voltage divider is connected to the control electrode of the first switching transistor.

24. A power-supply circuit as claimed in claim 6, wherein the first resistor of the voltage divider is connected to the control electrode of the first switching transistor.

25. A power-supply circuit as claimed in claim 7, wherein the first resistor of the voltage divider is connected to the control electrode of the first switching transistor.

26. A power-supply circuit as claimed in claim 2, wherein the power-supply circuit further comprises a feedback capacitor and a feedback resistor connected in series between the control electrode of the first switching transistor and a node between the rectifier diode and the secondary winding (W2).

27. A power-supply circuit as claimed in claim 3, wherein the power-supply circuit further comprises a feedback capacitor and a feedback resistor connected in series between the control electrode of the first switching transistor and a node between the rectifier diode and the secondary winding.

28. A power-supply circuit as claimed in claim 4, wherein the power-supply circuit further comprises a feedback capacitor and a feedback resistor connected in series between the control electrode of the first switching transistor and a node between the rectifier diode and the secondary winding.

29. A power-supply circuit as claimed in claim 5, wherein the power-supply circuit further comprises a feedback capacitor and a feedback resistor connected in series between the control electrode of the first switching transistor and a node between the rectifier diode and the secondary winding.

30. A power-supply circuit as claimed in claim 6, wherein the power-supply circuit further comprises a feedback capacitor and a feedback resistor connected in series between the control electrode of the first switching transistor and a node between the rectifier diode (D3) and the secondary winding (W2).

31. A power-supply circuit as claimed in claim 7, wherein the power-supply circuit further comprises a feedback capacitor and a feedback resistor connected in series between the control electrode of the first switching transistor and a node between the rectifier diode and the secondary winding.

32. A power-supply circuit as claimed in claim 10, wherein the power-supply circuit further comprises a feedback capacitor and a feedback resistor connected in series between the control electrode of the first switching transistor and a node between the rectifier diode and the secondary winding.

33. A power supply circuit as claimed in claim 1 further comprising, in series, a third switching transistor and a further resistor coupled to the control electrode of the second switching transistor and to a voltage terminal, and means for applying a bias voltage to a control electrode of the third switching transistor.

34. A self-oscillating power supply circuit for supplying power to load comprising:

a transformer having a primary winding coupled to a source of supply voltage and having a secondary winding, first and second switching transistors and a sensing resistor connected in series circuit to the primary winding and to the load, means including the second switching transistor for periodically turning off the first switching transistor in response to a voltage developed across the sensing resistor, a feedback circuit coupling the transformer secondary winding to a control electrode of the first switching transistor, and a rectifier element connected in series with the load to the secondary winding.

35. A self-oscillating power supply circuit as claimed in claim 34 wherein said first and second switching transistors are of opposite conductivity type and the sensing resistor is connected in said series circuit between the first and second switching transistors.

36. A self-oscillating power supply circuit as claimed in claim 34 further comprising a resistor coupled between a control electrode of the second switching transistor and a voltage terminal, and wherein the series connection of the rectifier element and the load is coupled across the secondary winding.

37. A self-oscillating power supply circuit as claimed in claim 34 further comprising a resistor and a third switching transistor coupled between a control electrode of the second switching transistor and a voltage terminal, and means for applying a bias voltage to a control electrode of the third switching transistor.

38. A self-oscillating power supply circuit as claimed in claim 34 further comprising a compensation resistor coupled between a control electrode of the second switching transistor and a node between the rectifier element and the secondary winding for compensation of variations in the voltage of the source of supply voltage.

39. A self-oscillating power supply circuit as claimed in claim 36 wherein the voltage terminal is either a node between the rectifier element and the load or a node between the secondary winding and the load.

40. A self-oscillating power supply circuit as claimed in claim 34 wherein the feedback circuit comprises a serially connected further resistor and a capacitor, and said series circuit is connected between one terminal of the primary winding and a terminal of the load, whereby both transformer primary winding current and transformer secondary winding current flow into the load.

41. A power supply circuit as claimed in claim 33 wherein the third switching transistor is the same conductivity type as the first switching transistor and the main current conduction paths of the first and second switching transistors are connected in series via the current sensing resistor.

* * * * *